United States Patent [19]

Schade et al.

[11] Patent Number: 5,578,684
[45] Date of Patent: Nov. 26, 1996

[54] PREPARATION OF POLYVINYLPYRIDINE N-OXIDES

[75] Inventors: Christian Schade, Ludwigshafen; Dieter Boeckh; Juergen Detering, both of Limburgerhof, all of Germany

[73] Assignee: BASF Aktiengesellschaft, Ludwigshafen, Germany

[21] Appl. No.: 507,237

[22] PCT Filed: Feb. 21, 1995

[86] PCT No.: PCT/EP94/00490

§ 371 Date: Aug. 24, 1995

§ 102(e) Date: Aug. 24, 1995

[87] PCT Pub. No.: WO94/20549

PCT Pub. Date: Sep. 15, 1994

[30] Foreign Application Priority Data

Mar. 3, 1993 [DE] Germany ............... 43 06 609.7

[51] Int. Cl.$^6$ ....................................... C08F 8/42
[52] U.S. Cl. .................. 525/360; 525/327.1; 525/370; 525/371; 525/372
[58] Field of Search .................. 525/360, 370, 525/371, 372

[56] References Cited

U.S. PATENT DOCUMENTS 3,047,579  7/1962  Witman.
3,159,611  12/1964  Dunn et al..

FOREIGN PATENT DOCUMENTS 1097450  9/1966  United Kingdom.

*Primary Examiner*—Bernard Lipman
*Attorney, Agent, or Firm*—Oblon, Spivak, McClelland, Maier & Neustadt, P.C.

[57] ABSTRACT

Polyvinylpyridine N-oxides are prepared by oxidizing polyvinyl-pyridines with aqueous solutions of hydrogen peroxide in the presence of acids and oxides or acids of elements of Groups 5b, 6b, 7b and 8 of the Periodic Table or of salts of these acids as catalyst, it also being possible for the oxidation to take place in the absence of the catalysts when from 40 to 80% strength aqueous solutions of at least dibasic carboxylic acids or of polymers of monoethylenically unsaturated carboxylic acids are used as solvent.

12 Claims, No Drawings

PREPARATION OF POLYVINYLPYRIDINE N-OXIDES

The invention relates to a process for preparing polyvinylpyridine N-oxides by oxidizing polyvinylpyridines with aqueous solutions of hydrogen peroxide in the presence of acids at pH values below 7.

GB-A 1 097 450 discloses the preparation of polyvinylpyridine N-oxide by oxidizing poly-2-vinylpyridine in glacial acetic acid as solvent with a 30% strength aqueous solution of hydrogen peroxide at 50° C. The industrial implementation of such a process entails difficulties because the separation of the carboxylic acids used from the polyvinylpyridine N-oxides is problematic and because during the preparation there is formation of unstable peracids which are capable of detonation and can be handled only with special safety precautions. Concerning the problems in the use of peroxyacetic acid in the preparation of N-oxides, reference is made to U.S. Pat. No. 3,047,579, lines 35–50. As is also stated therein, the formation of N-oxides in the reaction of tertiary aromatic amines with hydrogen peroxide in aqueous solution takes place so slowly as to be unsuitable for industrial preparation.

According to U.S. Pat. No. 3,047,579, tertiary amines are oxidized with hydrogen peroxide in glacial acetic acid or in aqueous solution in the presence of catalytic amounts of acid-forming elements of Groups 5b, 6b, 7b and 8 of the Periodic Table.

It is an object of the present invention to provide a process for oxidizing polymers which contain vinylpyridine units which can be implemented industrially.

We have found that this object is achieved by a process for preparing polyvinylpyridine N-oxides by oxidizing polyvinylpyridines with aqueous solutions of hydrogen peroxide in the presence of acids when the oxidation is additionally carried out in the presence of oxides or acids of elements of Groups 5b, 6b, 7b and 8 of the Periodic Table or of salts of these acids as catalyst, or when the oxidation is carried out in from 40 to 80% by weight aqueous solutions of at least dibasic carboxylic acids or of polymers of monoethylenically unsaturated carboxylic acids as solvent in the presence or absence of the catalysts. Oxides, acids or salts derived from tungsten, molybdenum or vanadium are preferably used as catalyst.

It is possible by the process according to the invention to oxidize both homo- and copolymers of vinylpyridines. The vinyl group can be in position 2, 3 or 4 of the pyriding ring. The preparation of homo- and copolymers from these monomers is known in the art. Copolymers of vinylpyridine contain at least 5% by weight of vinylpyridine units. Suitable comonomers are all monoethylenically unsaturated monomers which can copolymerize with vinylpyridine, for example vinyl esters such as vinyl acetate, vinyl propionate and vinyl butyrate, styrene, α-methylstyrene, divinylbenzene, monoethylenically unsaturated carboxylic acids such as acrylic acid, methacrylic acid, maleic acid, itaconic acid, citraconic acid and crotonic acid, anhydrides of monoethylenically unsaturated carboxylic acids such as maleic anhydride or itaconic anhydride, esters of monoethylenically unsaturated carboxylic acids and $C_1$–$C_6$-alcohols, N-vinylpyrrolidone, N-vinylcaprolactam, N-vinylimidazole, N-vinylformamide, N-methyl-N-vinylacetamide, N-vinylacetamide and quaternized basic vinyl compounds such as N-vinyl-N-methylimidazole and N-alkylvinylpyridines with 1 to 12 carbon atoms in the alkyl group.

Polymers of 4-vinylpyridine are preferably oxidized. All polyvinylpyridines can be converted by the process according to the invention into the corresponding N-oxides. This applies both to low molecular weight and to very high molecular weight polyvinylpyridines. Suitable polyvinylpyridines have K values from 8 to 350. Polyvinylpyridines which have molecular weights from 1000 to 300 000 are preferably used. Such polymers have K values from 10 to 100 (determined by the method of H. Fikentscher in 1% strength solutions in ethanol at 25° C.). The aqueous hydrogen peroxide solutions used in the process according to the invention normally have a hydrogen peroxide concentration of from 5 to 90%, preferably 20 to 60%, by weight.

The oxidation takes place in the presence of acids. It is possible to use inorganic acids such as sulfuric acid or phosphoric acid or organic acids such as formic acid, acetic acid, propionic acid, coconut fatty acid, stearic acid, benzenesulfonic acid, p-toluenesulfonic acid and/or alkylsulfonic acids.

Whereas the prior art oxidation of polyvinylpyridines takes place in acetic acid/hydrogen peroxide solutions with water contents below 15% by weight and acetic acid contents above 50% by weight, the water content in the reaction medium for the process according to the invention is at least 20, preferably at least 25, % by weight. Suitable carboxylic acids apart from the abovementioned monobasic carboxylic acids are at least dibasic carboxylic acids, eg. oxalic acid, succinic acid, $C_1$–$C_{18}$-alkylsuccinic acids and alkenylsuccinic acids, glutaric acid, adipic acid, phthalic acid, terephthalic acid, tartaric acid and citric acid. It is also possible in place of the free acids to use the anhydrides of the carboxylic acids when available.

Also suitable as acids are aqueous solutions of polymers of mono-ethylenically unsaturated carboxylic acids, eg. polymaleic acid, polyacrylic acid, polymethacrylic acid, copolymers of acrylic acid and methacrylic acid, copolymers of acrylic acid and maleic acid, copolymers of acrylic acid and itaconic acid and copolymers of methacrylic acid and maleic acid. The copolymers can contain said comonomers in any desired ratios. Homo- and copolymers of monoethylenically unsaturated carboxylic acids are known. The molecular weights of suitable polymers may be up to 50,000. Homo- and copolymers with molecular weights of up to 10,000 are preferably used. When polymeric carboxylic acids are used there may be formation of partially or completely insoluble complexes of polycarboxylic acids and polyvinylpyridine or polyvinylpyridine N-oxides. The precipitation of such complexes can, however, be completely or partly prevented by raising the pH of the reaction mixture to values above 4. The polymer/polymer complexes can, however, also be oxidized in suspension.

The oxidation of polyvinylpyridine in the process according to the invention preferably takes place with a water content in the reaction mixture at the start of the oxidation of at least 25% by weight. The water content in the reaction mixture always refers to the content at the start of the reaction. Depending on the concentration of the hydrogen peroxide used as oxidizing agent, there is a change in concentration in respect of the water content during the oxidation. At the start of the reaction it should normally not be above 60% by weight. With low concentrations of acid, ie. in the range of, for example, from 1 to 50% by weight in the reaction mixture, the oxidation according to the invention is carried out in the presence of oxides or acids of elements of Groups 5b, 6b, 7b and 8 of the Periodic Table or of salts of these acids as catalyst. Preferred catalysts are oxides, acids or salts derived from tungsten, molydenum or vanadium. Catalysts of this type and their mode of action are described in column 4 of U.S. Pat. No. 3,047,579 which was mentioned at the outset. As also stated therein, the heteropoly forms of the acids of the acid-forming elements of Group 6 of the Periodic Table are also used as catalyst. Described in simple terms, a peroxy compound is formed in situ from the hydrogen peroxide and the suitable catalysts and is unstable and represents the actual oxidizing agent. Catalysts which are preferably used are sodium tungstate, phosphotungstic acid, tungstic acid and the corresponding molybdenum derivatives such as sodium molybdate, phosphomolybdic acid, molybdic acid or mixtures thereof. The catalysts are used in amounts of from 0.005 to 20, preferably 0.05 to 2, % by weight calculated as transition metals in the catalyst with respect to polymer. In most cases, amounts of from 0.1 to 1% by weight of catalysts are sufficient.

The oxidation can in principle also be carried out in the absence of acids. However, a procedure in which the oxidation is carried out in the presence of acids is preferred because the polymers containing vinylpyridine units then dissolve partially or even completely in the aqueous reaction medium. If the polyvinylpyridines which are to be oxidized are insoluble in water, the polymer is suspended in the aqueous reaction medium. As the oxidation of the polymer advances, it dissolves partially or completely in the reaction medium.

Degrees of oxidation and reaction rates comparable with the oxidation in the presence of catalysts are achieved in a variant of the process in which the oxidation of the polyvinylpyridines is carried out in from 40 to 80% by weight aqueous solutions of at least dibasic carboxylic acids or in aqueous solutions of identical concentration of polymers of monoethylenically unsaturated carboxylic acids as solvent. Particularly suitable at least dibasic carboxylic acids are citric acid and saturated aliphatic $C_2$-$C_{12}$-dicarboxylic acids. When the oxidation is started with from 40 to 80% by weight aqueous reaction solutions to which hydrogen peroxide is added, relatively high degrees of oxidation of the polyvinylpyridines, and adequate reaction rates, are achieved. This is particularly the case when the oxidation is carried out in from 55 to 75% by weight aqueous solutions of at least dibasic carboxylic acids or of polymers of monoethylenically unsaturated carboxylic acids. The above-mentioned catalysts based on oxides or acids of elements of Groups 5b, 6b, 7b and 8 of the Periodic Table or of salts of these acids can, however, also be used when the reaction is carried out in from 40 to 80% by weight solutions of at least dibasic carboxylic acids or of aqueous solutions of polymers of monoethylenically unsaturated carboxylic acids as solvent. In these cases there is a further increase in the degree of oxidation and a speeding up of the oxidation reaction. The oxidation preferably takes place in the presence of from 0.1 to 1% by weight of sodium tungstate, phosphotungstic acid, tungstic acid or the corresponding molybdenum derivatives.

The oxidation is carried out at from 20 to 140, preferably 50° to 120, °C. At temperatures above 100° C., the reaction takes place under elevated pressure in pressure apparatus. The polymer concentration in the reaction mixture can be from 5 to 70% by weight and is usually in the range from 20 to 50% by weight. The process according to the invention results in polyvinylpyridine N-oxides which preferably have molecular weights in the range from 1000 to 300 000 and K values from 8 to 80 (determined by the method of H. Fikentscher in 5% strength aqueous sodium chloride solution with a polymer concentration of 1% by weight). The polyvinylpyridines used in the process according to the invention are up to 100, preferably 50–98, % oxidized. The degree of oxidation can be determined, for example, by quantitative analysis of the N-O vibration bands at 1478–1494 $cm^{-1}$ in the infrared spectrum (KBr disk) using an internal standard.

The oxidized homo- and copolymers of vinylpyridines prepared according to the invention are suitable, for example, as therapeutic agent for the treatment of silicosis.

The K values indicated in the examples were determined by the method of H. Fikentscher, Cellulose-Chemie, 13 (1932) 58–64 and 71–74 in 5% strength aqueous sodium chloride solution with a polymer concentration of 1% by weight and at 25° C. Where other solvents were used, this is indicated in the examples.

EXAMPLE 1

150 g of water, 90 g of 4-vinylpyridine and 1.8 g of polyvinylpyrrolidone with a K value of 90, measured in 1% strength aqueous solution, were dissolved by stirring in a flanged flask and heated under nitrogen to 80° C. As soon as this temperature was reached, 1.4 g of 4,4'-azobis(4-cyanopentanoic acid) in 50 g of water were added dropwise to the mixture over the course of 1 h. The mixture was stirred at this temperature for 4 h and then cooled to 60° C. At this temperature, 65 g of acetic acid were added, and the mixture was stirred until a homogeneous solution was produced. After renewed heating to 80° C., 1.63 ml of concentrated sulfuric acid and 4.5 ml of a 1% strength aqueous solution of phosphotungstic acid were added to the mixture, and subsequently 63 g of a 50% strength solution of hydrogen peroxide were added dropwise over the course of 6 h. After a further 2 h at this temperature, the solution was subjected to steam distillation for 1.5 h and subsequently freeze-dried. The polymer had a K value of 48.3. The degree of oxidation was 87%.

EXAMPLE 2

28.5 g of poly-4-vinylpyridine with a K value of 24.0 (measured as 1% strength solution in ethanol) were dissolved in 21.5 g of glacial acetic acid and added to a solution of 0.14 g of tungstic acid in 64 ml of water. The solution was heated to 80° C., and 27.7 g of 50% strength hydrogen peroxide were metered in at 80° C. over the course of 1 h. The reaction was allowed to continue for a further 4 h at 80° C. and then, in order to destroy remaining hydrogen peroxide, 200 mg of palladium on active carbon were added and stirring was continued for 4 h. After filtration, the product was freeze-dried. The degree of oxidation was 92%, and the K value (measured as 1% strength solution in 5% strength NaCl solution) was 25.9.

EXAMPLE 3

28.5 g of poly-4-vinylpyridine with a K value of 24.0 (measured as 1% strength solution in ethanol) were dissolved in 21.5 g of glacial acetic acid and added to a solution of 0.14 g of molybdic acid in 64 ml of water. The solution was heated to 80° C., and 27.7 g of 50% strength hydrogen peroxide were metered in at 80° C. over the course of 1 h. The reaction was allowed to continue for a further 4 h at 80° C. and then 50 mg of 5% palladium on active carbon were added and stirring was continued for 4 h. After filtration, the product was freeze-dried. The degree of oxidation was 84%, and the K value (measured as 1% strength solution in 5% strength NaCl solution) was 25.1.

EXAMPLE 4

28.5 g of poly-4-vinylpyridine with a K value of 24.0 (measured as 1% strength solution in ethanol) were dissolved in 21.5 g of glacial acetic acid and added to a solution of 0.14 g of phosphomolybdic acid in 64 ml of water. The solution was heated to 80° C., and 27.7 g of 50% strength hydrogen peroxide were metered in at 80° C. over the course of 1 h. The reaction was allowed to continue for a further 4 h at 80° C. and then 50 mg of 5% palladium on active carbon were added and stirring was continued for 4 h. After filtration, the product was freeze-dried. The degree of oxidation was 84%, and the K value (measured as 1% strength solution in 5% strength NaCl solution) was 25.0.

EXAMPLE 5

100 g of poly-4-vinylpyridine with a K value of 30.7 (measured as 1% strength solution in ethanol) were suspended in 133 ml of water and dissolved by addition of 267.0 g of citric acid monohydrate at 115° C. (bath temperature) in portions over the course of 1 h. To this solution were added 3 ml of concentrated sulfuric acid and, over the course of 1 h at 115° C. (bath), 126.4 g of 30% strength hydrogen peroxide were metered in. Reaction was then allowed to continue at 115° C. for 3 h. The resulting solution was freeze-dried for characterization. The degree of oxidation was 57%; the K value ( measured as 1% strength solution in 5 % strength NaCl solution ) was 28.9.

EXAMPLE 6

240 g of poly-4-vinylpyridine with a K value of 24.0 (measured as 1% strength solution in ethanol) were suspended with a solution of 24 g of citric acid in 136 g of water at 90° to 100° C., most of the polymer dissolving. 2.4 g of phosphotungstic acid were added and, at 80° to 85° C., 233 g of 50% strength hydrogen peroxide were metered in over the course of 3 h, during which the polymer completely dissolved. The solution was kept at 80° to 85° C. for 4 h. Subsequently 50 mg of 5% palladium on active carbon were added, and the mixture was vigorously stirred at 80° to 85° C. for a further 2 h. The solution was filtered and freeze-dried for characterization. The degree of oxidation was 76%, and the K value (measured as 1% strength solution in 5% strength NaCl solution) was 22.3.

EXAMPLE 7

Kinetics of the Peroxide Consumption in the Oxidation of poly-4-vinylpyridine The rate of the oxidation of polyvinylpyridine with hydrogen peroxide in aqueous/acetic acid medium was investigated with various amounts of catalyst at 80° C. by following the decrease in the oxidizing agent content with time by iodometry. The determination of the residual peroxide content by iodometry was carried out as described by Jander, Jahr and Knoll, MaBanalyse, W. de Gruyter Verlag, Berlin, 1973, pages 92–121, by adding iodide and titrating the liberated iodine against thiosulfate solution. The increase in the reaction rate with increasing amounts of phosphotungstic acid is evident from the results in the table.

Table

Residual peroxide content [%] in the reaction mixture of poly-4-vinylpyridine with a K value of 42 in 15% strength solution in water/acetic acid (66:33) at 80° C. as a function of the amount of catalyst (phosphotungstic acid)

TABLE

| Residual peroxide content [%] in the reaction mixture of poly-4-vinylpyridine with a K value of 42 in 15% strength solution in water/acetic acid (66:33) at 80° C. as a function of the amount of catalyst (phosphotungstic acid) | | | | |
|---|---|---|---|---|
| Amount of catalyst | Reaction time | | | |
| [% by wt] | 0 | 30 min | 45 min | 60 min |
| 0 | 100 | 88 | 83 | 77 |
| 0.5 | 100 | 80 | 58 | 42 |
| 1.0 | 100 | 45 | 17 | 4.2 |
| 5.0 | 100 | 34 | 8.2 | 0.4 |

We claim:

1. A process for preparing polyvinylpyridine N-oxides, comprising:

oxidizing polyvinylpyridines in an aqueous hydrogen peroxide solution having a water content of at least 25% in the presence of an acid and a catalyst of an oxide, acid or salt thereof of an element of Group 5b, 6b, 7b or 8.

2. The process of claim 1, wherein tungsten, molybdenum or vanadium is the active metal of said oxide, acid or salt catalyst.

3. The process of claim 1, wherein said acid is an inorganic acid or organic acid.

4. The process of claim 3, wherein said inorganic acid is sulfuric acid or phosphoric acid, and said organic acid is formic acid, acetic acid, propionic acid, coconut fatty acid, stearic acid, benzenesulfonic acid, p-toluenesulfonic acid or an alkyl sulfonic acid.

5. The process of claim 1, wherein the oxidation is conducted in the presence of from 0.1 to 1% by weight of sodium tungstate, phosphotungstic acid, tungstic acid, sodium molybdate, phosphomolybdic acid, molybdic acid or mixtures thereof.

6. The process of claim 1, wherein said oxidation is conducted at a temperature from 20° to 140° C. and the polymer concentration in the reaction mixture ranges from 5 to 70% by weight.

7. A process for preparing polyvinylpyridine N-oxides, comprising:

oxidizing polyvinylpyridines in an aqueous hydrogen peroxide solution which is a 40 to 80% by weight aqueous solution of at least one dibasic carboxylic acid or a polymer of a monoethylenically unsaturated carboxylic acid in the presence or absence of a catalyst.

8. The process of claim 7, wherein said catalyst is an oxide, acid or salt thereof of tungsten, molybdenum or vanadium.

9. The process of claim 8, wherein the aqueous solution is a 55 to 75% by weight aqueous solution.

10. The process of claim 7, wherein said polymer of a monoethylenically unsaturated carboxylic acid is polymaleic acid, polyacrylic acid, polymethacrylic acid, copolymers of acrylic acid and methacrylic acid, copolymers of acrylic acid and maleic acid, copolymers of acrylic acid and itaconic acid or copolymers of methacrylic acid and maleic acid.

11. The process of claim 7, wherein the aqueous oxidation medium contains citric acid, a saturated aliphatic $C_{2-12}$-dicarboxylic acid, or combination thereof.

12. The process of claim 11, wherein the oxidation is conducted in the presence of from 0.1 to 1% by weight of sodium tungstate, phosphotungstic acid, tungstic acid, sodium molybdate, phosphomolybdic acid, molybdic acid or mixtures thereof.

* * * * *

UNITED STATES PATENT AND TRADEMARK OFFICE
CERTIFICATE OF CORRECTION

PATENT NO. : 5,578,684
DATED : November 26, 1996
INVENTOR(S) : Christian SCHADE, et al.

It is certified that error appears in the above-indentified patent and that said Letters Patent is hereby corrected as shown below:

On the title page, Item [22], the PCT filing date, should read:

--Feb. 21, 1994--

Signed and Sealed this

Fourth Day of March, 1997

*Attest:*

BRUCE LEHMAN

*Attesting Officer*  Commissioner of Patents and Trademarks

(12) EX PARTE REEXAMINATION CERTIFICATE (7575th)
United States Patent
Schade et al.

(10) Number: US 5,578,684 C1
(45) Certificate Issued: Jun. 29, 2010

(54) PREPARATION OF POLYVINYLPYRIDINE N-OXIDES

(75) Inventors: Christian Schade, Ludwigshafen (DE); Dieter Boeckh, Limburgerhof (DE); Juergen Detering, Limburgerhof (DE)

(73) Assignee: BASF Aktiengesellschaft, Ludwigshafen (DE)

Reexamination Request:
No. 90/006,554, Feb. 22, 2003
No. 90/006,894, Dec. 23, 2003

Reexamination Certificate for:
Patent No.: 5,578,684
Issued: Nov. 26, 1996
Appl. No.: 08/507,237
Filed: Aug. 24, 1995

Certificate of Correction issued Mar. 4, 1997.

(22) PCT Filed: Feb. 21, 1994

(86) PCT No.: PCT/EP94/00490

§ 371 (c)(1),
(2), (4) Date: Aug. 24, 1995

(87) PCT Pub. No.: WO94/20549

PCT Pub. Date: Sep. 15, 1994

(30) Foreign Application Priority Data

Mar. 3, 1993 (DE) ........................ 43 06 609.7

(51) Int. Cl.
*C08F 8/42* (2006.01)

(52) U.S. Cl. .................... 525/360; 525/327.1; 525/370; 525/371; 525/372

(58) Field of Classification Search .................. 525/360, 525/327.1, 370, 371, 372
See application file for complete search history.

(56) References Cited

U.S. PATENT DOCUMENTS

| | | |
|---|---|---|
| 2,624,655 A | 1/1953 | Greenspan |
| 3,047,579 A | 7/1962 | Witman |
| 3,159,611 A | 12/1964 | Dunn et al. |
| 4,019,893 A | 4/1977 | Plant et al. |
| 4,070,442 A | 1/1978 | Watts |
| 4,362,706 A | 12/1982 | Willard |
| 4,534,945 A | 8/1985 | Hopkins et al. |

FOREIGN PATENT DOCUMENTS

| | | |
|---|---|---|
| DE | 1495819 | 6/1968 |
| DE | 1495 819 | 7/1969 |
| GB | 1079 846 | 8/1967 |
| GB | 1079846 | 8/1967 |
| HU | 002813 | 12/1986 |
| HU | 183595 | 12/1986 |
| IL | 14445 | 1/1982 |

OTHER PUBLICATIONS

Abramovitch, R. A., Editor, *Pyridine and Its Derivatives,* John Wiley & Sons, New York, pp. 1–5, 243.
Hamana, Masatomo; Nomura, Sauzo; and Kawakita, Takeshi, "Studies on Tertiary Amine Oxides, XLI, Preparation of Aromatic N–Oxides of Pyridine Series by Oxidation with Hydrogen Peroxide–Sodium Tungstate", *Yakugaku Zasshi,* vol. 91 (1971), pp. 134–137.
Affidavit of Charles R. Hopper as to Wittman Example V, Case No. IP01–1936–C Y/B, *BASF Aktiengessellschaft* v. *Reilly Industries, Inc.*
Hamana et al., "Studies on Tertiary Amine Oxides, XLI. Preparation of Aromatic N–Oxides of Pyridine Series by Oxidation with Hydrogen Peroxide–Sodium Tungstate," Faculty of Pharmaceutical Sciences, Kyushu Univ., Aug. 31, 1970, vol. 91 (1971), pp. 134–137.
Kobayashi, "Studies on the Reaction of Heterocyclic Compounds, XII. N–Oxidation of Diazabenzene and Diazanaphthalene," Tokyo College of Pharmacy, Feb. 28, 1974, vol. 22 (1974), pp. 2097–2100.
Heller et al., "Poly–(1–hydroxy–4–vinylpyridimium) Anion–exchangers," J. Chem Soc. (1963), pp. 1579–82.
Albini et al., "Heterocyclie N–Oxides," Dept. of Organic Chemistry, Univ. of Pavia, 1991, pp. 31–36.
Abramovitich et al., "Pyridine–1–oxides," Dept. of Chemistry, Supplement Part Two, Univ. of Alabama and Wayne State Univ., pp. 3–5.
Schumb et al., "Hydrogen Peroxide" (1955) Chapter 9, pp. 515–547.

*Primary Examiner*—Peter D Mulcahy

(57) ABSTRACT

Polyvinylpyridine N-oxides are prepared by oxidizing polyvinyl-pyridines with aqueous solutions of hydrogen peroxide in the presence of acids and oxides or acids of elements of Groups 5b, 6b, 7b and 8 of the Periodic Table or of salts of these acids as catalyst, it also being possible for the oxidation to take place in the absence of the catalysts when from 40 to 80% strength aqueous solutions of at least dibasic carboxylic acids or of polymers of monoethlenically unsaturated carboxylic acids are used as solvent.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7-12 is confirmed.

Claims 1-6 are cancelled.

* * * * *